(12) United States Patent
Meadow et al.

(10) Patent No.: US 8,666,657 B2
(45) Date of Patent: *Mar. 4, 2014

(54) METHODS FOR AND APPARATUS FOR GENERATING A CONTINUUM OF THREE-DIMENSIONAL IMAGE DATA

(76) Inventors: William D. Meadow, Jacksonville, FL (US); Randall A. Gordie, Jr., St. Augustine, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,226

(22) Filed: Oct. 11, 2011

(65) Prior Publication Data
US 2012/0076358 A1 Mar. 29, 2012

Related U.S. Application Data

(62) Division of application No. 12/035,423, filed on Feb. 21, 2008, now Pat. No. 8,078,396.

(51) Int. Cl.
*G01C 21/00* (2006.01)
(52) U.S. Cl.
USPC ........... 701/436; 701/300; 701/458; 701/523; 382/154; 382/285

(58) Field of Classification Search
USPC ......... 701/408, 409, 428, 436, 458, 300, 523; 345/619, 629, 645; 382/284, 285, 154, 382/162, 164; 348/E5.053
See application file for complete search history.

(56) References Cited

U.S. PATENT DOCUMENTS

| | | | | |
|---|---|---|---|---|
| 6,525,731 | B1 * | 2/2003 | Suits et al. | 345/427 |
| 6,798,924 | B2 * | 9/2004 | Ejiri et al. | 382/284 |
| 6,985,638 | B1 * | 1/2006 | Aoki | 382/284 |
| 7,139,422 | B2 * | 11/2006 | Hauck et al. | 382/141 |
| 7,181,081 | B2 * | 2/2007 | Sandrew | 382/254 |
| 7,317,558 | B2 * | 1/2008 | Chiba | 358/450 |
| 7,573,488 | B2 * | 8/2009 | Freyhult | 345/629 |
| 7,777,740 | B2 * | 8/2010 | Lee | 345/420 |

* cited by examiner

*Primary Examiner* — Gertrude Arthur Jeanglaude
(74) *Attorney, Agent, or Firm* — Joseph P. Kincart (57) ABSTRACT

The present invention provides methods and apparatus for generating a continuum of image data sprayed over three-dimensional models. The three-dimensional models can be representative of features captured by the image data and based upon multiple image data sets capturing the features. The image data can be captured at multiple disparate points along another continuum.

20 Claims, 7 Drawing Sheets

METHODS FOR AND APPARATUS FOR GENERATING A CONTINUUM OF THREE-DIMENSIONAL IMAGE DATA

CROSS REFERENCE TO RELATED APPLICATIONS

The present application claims priority to patent application Ser. No. 12/035,423, entitled: Methods and Apparatus for Generating a Continuum of Three Dimensional Image Data, as a Divisional Patent Application, filed Feb. 21, 2008 now U.S. Pat. No. 8,078,396.

FIELD OF THE INVENTION

The present invention relates to methods and apparatus of generating image data. More specifically, the present invention relates to generating data descriptive of a continuum of three-dimensional images, such as those comprising a geographic landscape.

BACKGROUND OF THE INVENTION

Images of geographic areas created on a local basis have been created in numerous formats. Photographs, movie cameras, video camera recorders, and more recently digital recorders have all been utilized to capture moving images of a geographic parcel. Photographs can be useful because they are easily associated with a particular real estate parcel, however they are limited in the scope of the subject matter that they can include. In addition, photographs must be manually acquired and docketed in order to be associated with a property and subsequently retrieved. Panoramas can increase the scope of the subject matter to a point, but are limited by a point of capture of the panoramic views.

Movie pictures, video recorders and digital recorders and other "motion pictures" provide for increased scope of image capture. However, it is sometimes difficult to locate and view a particular portion of interest of images captured as motion pictures. In addition, correlation of particular portions of a motion picture with a particular real estate parcel can be difficult if the motion picture includes more than one real estate parcel. For example, it is relatively difficult to locate and view a particular real estate parcel in the context of its neighborhood setting, or particular aspects of its setting. Aerial images, such as satellite pictures of geographic areas have also been captured and specific parcels of land or landmarks can be located on the aerial images.

In addition, methods and apparatus have been known for generating point clouds and generating representations of particular objects from processing of the point clouds.

However, prior to the present invention, there has not been a mechanism for generating a continuum of object representations based upon point cloud data.

SUMMARY OF THE INVENTION

Accordingly, the present invention provides methods and apparatus for generating a continuum of three-dimensional image data. In some embodiments, the continuum of three-dimensional image data provides a street level representation of geographic locations. Two or more sets of image data are captured of a subject area, wherein each of the two or more images are captured from disparate points on a continuum.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments.

DETAILED DESCRIPTION OF PREFERRED EMBODIMENTS

The present invention provides methods and apparatus for capturing image data from multiple disparate points along a continuum and generating three-dimensional representations of a subject matter captured in the image data. In some embodiments, the three-dimensional representations can be assembled with the image data into a composite image. The composite image can include its own continuum of two dimensional image data sprayed over three-dimensional polygon based models.

In general, point clouds are generated utilizing the location of feature points present in multiple image sets in combination with the position and orientation of a camera capturing the image data set. The point clouds can in turn be processed to generate three-dimensional polygon based models representative of objects present in the subject matter of the image data set. The positional data can include, or be derived, from Cartesian coordinates, such as latitude and longitude coordinates indicating the position of a camera used to capture the image data, as well as an orientation of the camera. The continuum of image data, combined with the positional data associated with particular portions of the image data is used to create a new continuum of image data sprayed over the three-dimensional polygon based models.

The three-dimensional polygon based models can be the basis for a user interface with three-dimensional representations of objects captured by the image data sets. A user location within the model will determine which portions of the three-dimensional model are viewed. Some embodiments can include user interactive devices which allow a user to traverse the three-dimensional model in three directions: a) an essentially up and down vertical movement; b) an essentially side to side horizontal movement; and c) a depth movement into and out of the three-dimensional model. Image data and three-dimensional polygon based models presented to a user at a given instance can be dependent upon the relative position selected by the user within the user interface.

DEFINITIONS

As used herein, Video DriveBy™ refers to street level video data captured in multiple angles encompassing a 360° view.

As used herein, Video FlyBy™ refers to Aerial/Satellite oblique (angular) view images with polygon line views.

As used herein, RibbonView™ refers to a film strip like view of properties which stands up at approximately 90° from a flat or angled aerial/satellite ortho image map and provides direct-on front images of properties to be displayed.

As used herein, Flash Viewer (Streaming Video) refers to direct streaming of video to an online user via a web browser.

Methods

Figure 1:
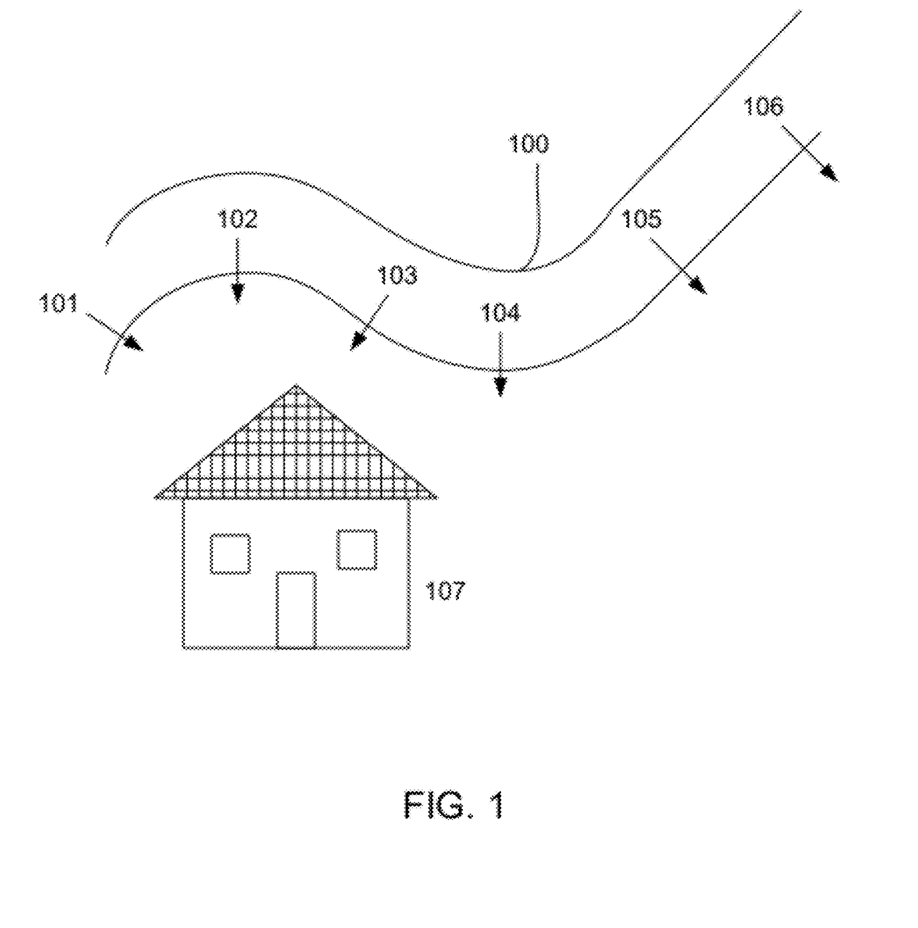
FIG. 1 illustrates a continuum from which image data sets capture a subject.

According to the present invention, image data is captured from disparate points along a continuum. Referring now to FIG. 1, in some embodiments the continuum 100 includes the path of a vehicle carrying a digital camera, or other image data capturing device. Image data sets are captured at disparate points 101-106 along the continuum. Some preferred embodiments include capturing each image data set at an angle that is generally orthogonal to the subject matter 107.

Positional data and orientation of the camera capturing image data sets is recorded for each disparate point 101-106 along the continuum from which an image data set is captured. Positional data can include any data indicative of where the subject matter of an image data set is located. Some preferred embodiments of positional data include Cartesian coordinates that are context sensitive according to the mechanism used to generate coordinate data.

Positional data can be generated, for example, by an image data recording device, such as a camera, associated with a device for recording a global position (GPS device). Time stamps associated with image data sets and time stamps associated with the GPS data can be utilized to correlate the GPS location data with image data set recorded by the image data recording device.

In still another aspect, in some embodiments, an altimeter can be used to record an altitude from which a camera records image data sets. The altitude data can be associated with an image data set, for example, metadata correlated with the image data set. Such embodiments can therefore include recordation of a latitude, longitude and altitude coordinate for a given image data set. In addition, it is also within the scope of this invention to record a time of generation of an image data set and a depth of focus for an image data set.

According to the present invention, geospatial data, such as latitude and longitude coordinates, can be generated by the GPS and stored with image data generated by the camera. In some embodiments, GPS data can be time stamped and collected once every second. However, in some instances, GPS reception can be interrupted, depending upon location relative to large object, such as multistory buildings, or cold cover. Therefore, some additional embodiments can include an accelerometer for recording motion associated with a camera and a GPS unit operatively attached to the camera.

Data from the accelerometer can indicate movement of the camera. Some accelerometers, such as micro electro-mechanical system (MEMs) accelerometers can easily be incorporated into a camera system assembly attached to a vehicle. Use of multiple MEM accelerometers positioned to measure movement in four or more directions along an x-axis, y-axis, and z-axis in relation to a camera can also be used to calculate direction of movement. The accelerometer can therefore be used to extrapolate a current position of the camera, based upon a last set of GPS geospatial data recorded.

Geospatial data can be used to indicate an initial geographic position. A change in geospatial data can be additionally utilized to indicate velocity and direction of image data set capture. Accelerometer data may also be used to indicate a velocity and direction of image data set capture. Accelerometer data may also be used to indicate a velocity and direction of camera movement. Calculations of time elapsed at the indicated velocity (such as for example, the Kalman Filter) can yield a calculated position at a time of image capture, even if the time of image capture is between GPS readings.

For example, one standard can include tracking a camera position with a GPS unit that records location at a rate of once per second. The camera can record image data at a faster rate than once per second, such as, for example, one of: 12 images per second, 24 images per second or 29.97 images per second. An initial camera position can be recorded which correlates with a GPS reading, subsequent image data capture will occur in between the one second GPS reading interval. The camera position can be determined with a calculation based upon the velocity of camera movement supplied by the accelerometer and time elapsed since a previous GPS reading.

Still other embodiments can utilize optical flow methodology and visual odometry to facilitate calculations of a camera position and the velocity of a vehicle or person from which a series of image data sets are captured. Visual odometry can be accomplished with a single omni-directional camera or with stereo cameras, and is based upon processing which tracks the position of salient features in a series of feature sets and calculates movement based upon the relative positions of the features. In some embodiments, camera based simultaneous localization and mapping (SLAM) of visual image data can also be used to facilitate calculations of velocity of a change in position of a camera used to capture image data sets. Typically, the velocity will be directly tied to the motion of a vehicle to which the camera is mounted, or a person carrying a camera rig.

Orientation of a camera can include a direction of image capture recorded by the camera. Orientation can be designated, for example, in relation to the cardinal directions, i.e. north, south, east and west. Any means available to record such a designation, such as an electronic compass, is within the scope of the present invention. However, it may be desirable to include a means to record the orientation with a greater degree of accuracy than is typically available through the use of an electronic compass.

Therefore, in some embodiments, orientation can be determined according to a fixed position of a camera in relation to the direction of travel of a vehicle (or person) used to transport the camera. For example, a plurality of cameras can be fixedly attached to a vehicle capturing Video DriveBy™ data. Each camera therefore maintains a constant direction of image capture in relation to the heading of the vehicle. Mechanics of the camera, such as, for example, lens parameters and shutter speed, can indicate a depth of field during camera image data capture. Some embodiments can also include simultaneously capturing multiple image data sets and correlating two or more of the image data sets. Correlation can be accomplished via a time stamp or other chronological or synchronous.

The position of a camera can be combined with a direction of image capture and the depth of field of the camera, to determine a location of image data captured by the camera at a particular instance in time. The present invention can also include apparatus for utilizing echo location to determine a distance of an object from a camera capturing an image data set and storing a correlated distance with the image data set. For example, radar data can be correlated with a camera image data set to calculate the location of various objects captured by the camera. A time stamp can also be combined with data to quantify a location for a particular image formed by the captured image data.

In some embodiments of the present invention data used to calculate a location of an image is stored in a metadata file space associated with the image data. For example, some embodiments can store metadata in the exchangeable image file format (EXIF), TIFFTAGS or International Press Telecommunication Council (IPTC) formats. Image data may be stored, for example in JPEG or TIFF formats. However, other metadata formats can also be used. Typically, due to the size of data files that are generated during capture of Video DriveBy™ data, the image data and metafile data are stored on an external data storage device, such as a hard disk drive operatively attached to the camera. However, in some embodiments, the data can be stored in the camera.

As discussed above, the metadata can include data descriptive of some or all of: date and time; camera settings such aperture, shutter speed and focal length; geospatial data from a GPS receiver unit; accelerometer data; inertial guidance system data; camera orientation; and camera fixed position related to vehicle travel.

Figure 2:
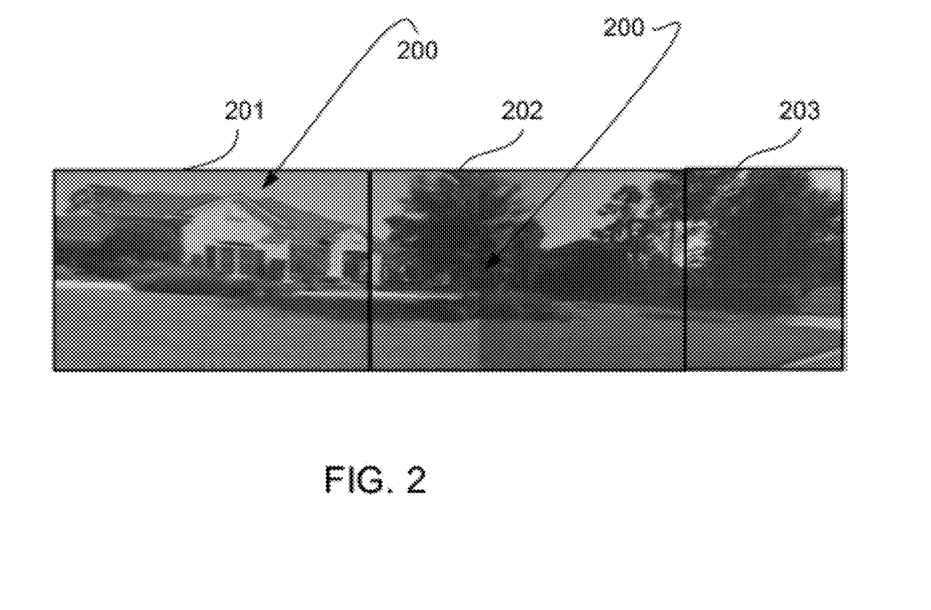
FIG. 2 illustrates multiple images captured from disparate points along a continuum.
Figure 3:
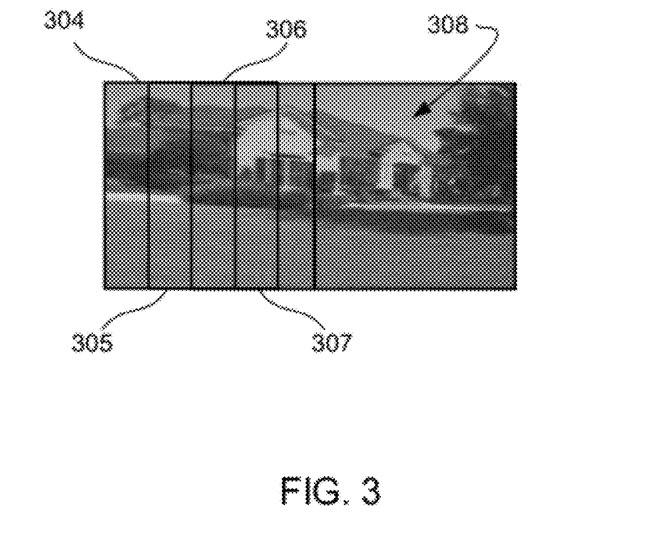
FIG. 3 illustrates multiple image data sets that overlap subject matter.

Referring now to FIG. 2, exemplary image data sets 201-203 are illustrated which capture images of a subject 200 from different points along a continuum. In some embodiments, as illustrated in FIG. 3, image data sets 304-307 overlap the subject matter captured. The overlap allows for features present in one image data set to be present in a second image data set, and preferably in a tertiary image data set.

Figure 4A:
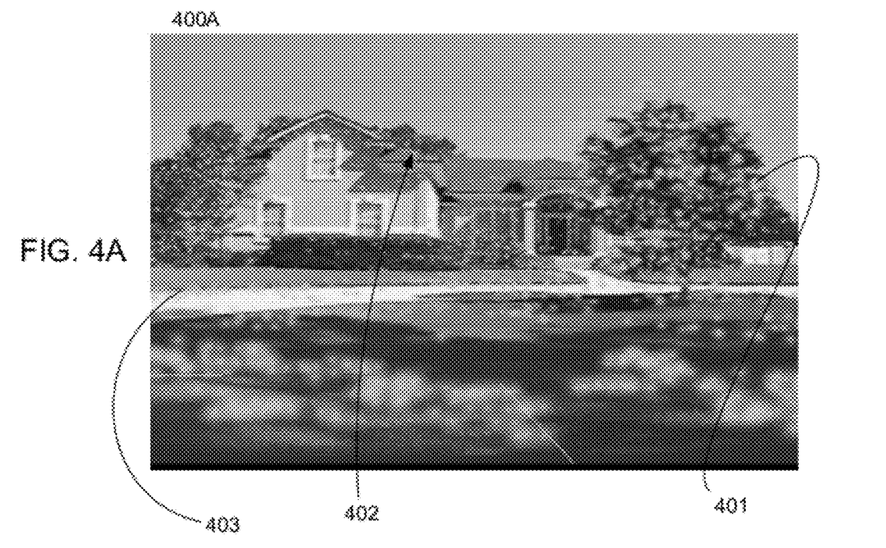
FIG. 4A illustrates an initial image data set with feature points indicated as voxels.

Referring now to FIG. 4A, a two dimensional image data set 400A is shown with highlighted pixels indicating feature points 401-403 of various objects contained within the image data set 400A. For example, one set of highlighted pixels 401 indicates feature points of a tree in a front yard of a real estate parcel. Another set of highlighted pixels 402 indicate feature points of a roof line of a house. A third set of highlighted pixels 403 indicate feature points along an edge of a driveway.

Figure 4B:
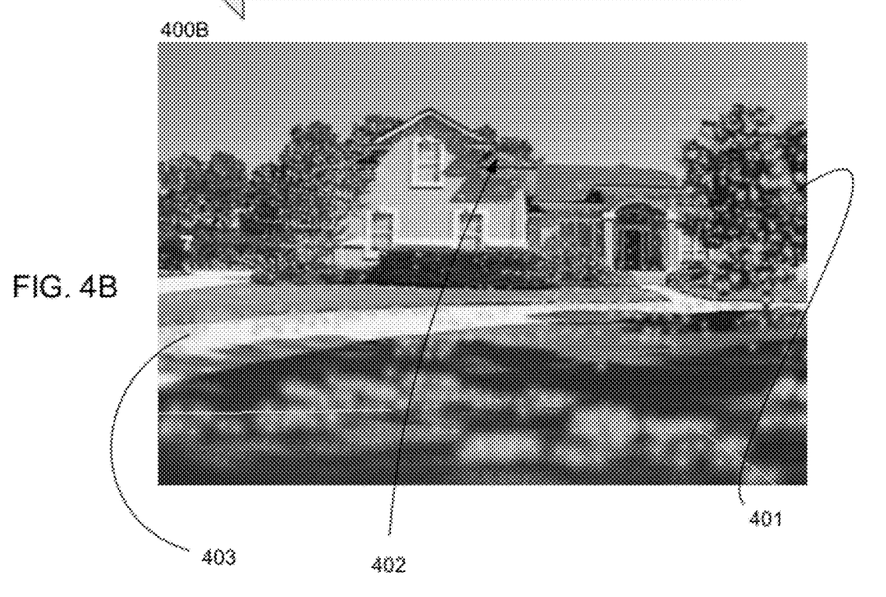
FIG. 4B illustrates an additional image data set with similar feature points indicated as voxels.

FIG. 4B illustrates a related two dimensional image data set 400B captured from a separate point along a continuum of travel 404. The image data set 400B includes many of the same features as image data set 400A and feature points 401-403 can be represented by highlighted pixels in image data set 400B. According to the present invention, the location of one or more features is registered and the relative position of one or more features is tracked. The relative position of the one or more feature points can be combined, for example, with location data and orientation of a camera used to capture the feature points to generate point arrays based upon the feature point data.

Figure 5A:
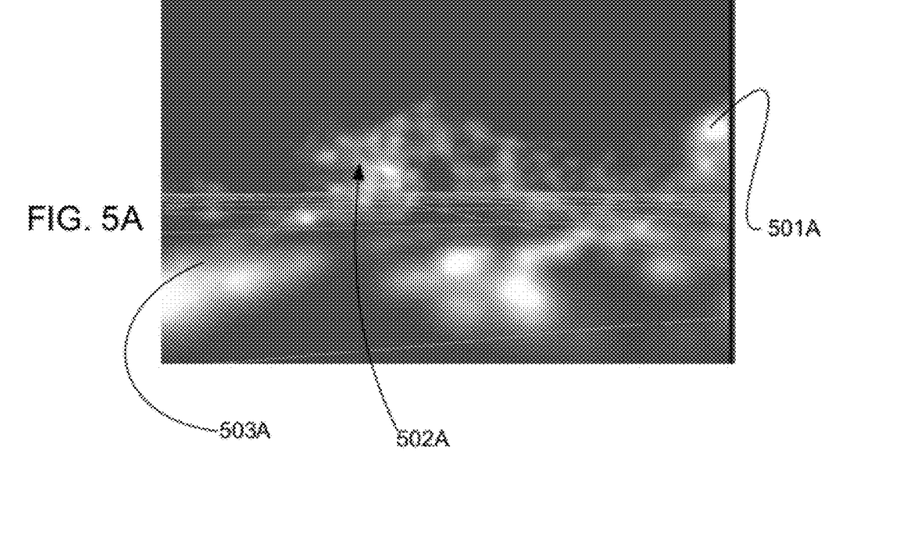
FIG. 5A illustrates an initial point cloud over a three-dimensional grid.
Figure 5B:
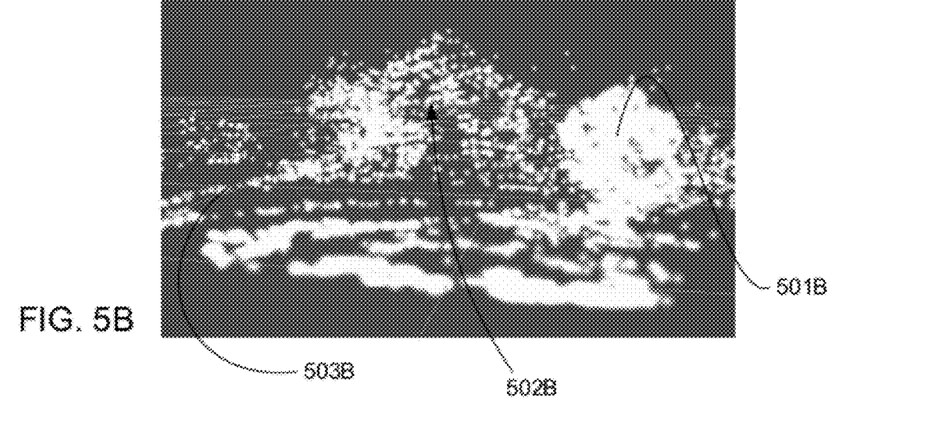
FIG. 5B illustrates an additional point cloud over a three-dimensional grid.

Referring now to FIG. 5A, point cloud arrays 501A-503A can be generated which represent various aspect of the image data sets. For example, a first point cloud array can represent the tree 501, a second point cloud array can represent the house 502 and a third point cloud array can represent the driveway 503. The position of each point cloud array is tracked. In some embodiments, as additional image data is made available, the data can be correlated with a particular geographic area and used create a more robust point clouds, Referring now to FIG. 5B point cloud arrays 501B-503B are illustrated based on additional image data sets of the same geographic area as that illustrated in FIG. 5A. Additional image data sets can be generated, for example, from one or more of: multiple cameras capturing image data from a vehicle traversing a continuum; from one or more cameras traveling a separate continuum proximate to the same geographic area; and from a single camera with a split image capture of a geographic area.

Multiple cameras can include, for example an array of cameras mounted to a vehicle in fixed positions relative to one another. The cameras may capture image data simultaneously or in timed sequence in order to capture related data. One or more cameras traveling a separate continuum can include a vehicle making multiple passes proximate to a geographic parcel. The passes may be during different time periods, such as, for example, once per month, or during the same general time period, such as driving up and down a street multiple times. A single camera with a split image can include, for example, a high resolution camera with mirrors fixed proximate to the camera lens. The mirrors can be maintained at a set distance apart and direct separate images to predetermined portions of the camera lens. The set distance between the mirrors can be useful, for example, for triangulation processing of distinct feature points.

In some embodiments, multiple cameras, or a split image can be utilized to provide image data that is displayed in relation to the vehicle from which the image data is captured. some further embodiments can include the display image data in relation to the vehicle from which the image has been captured with no artificial delay. Therefore, as the vehicle is in motion, the display can include an image, or other representation of the vehicle and a display of captured image data, according to the methods described herein, in relation to the representation of the vehicle.

Various embodiments can include storage of the captured image data, transmission of the image data, such as, for example via wireless transmission, or storage of the image data for some period of time, or until a predetermined amount of storage space has been utilized, after which the storage medium may store additional data over previously stored data. For example, a vehicle may carry a set amount of storage, and when a threshold amount of the storage has been utilized, image data can be stored over previously stored data. In other embodiments, image data may be stored for a predetermined amount of time, such as, for example, 2 hours, after which the image data may be overwritten. Still other embodiments can include reuse of storage medium used to store image data after image data has been transmitted. Transmitted image data may be stored on an image data server farm or other storage facility.

In another aspect, in some embodiments of the present invention, the geographic position of multiple vehicles can be determined, such as, for example via GPS coordinates. If image data is desired for a particular subject at a known location, the location of the multiple vehicles may be used to determine which vehicle is used to capture image data of the particular subject.

Figure 6:
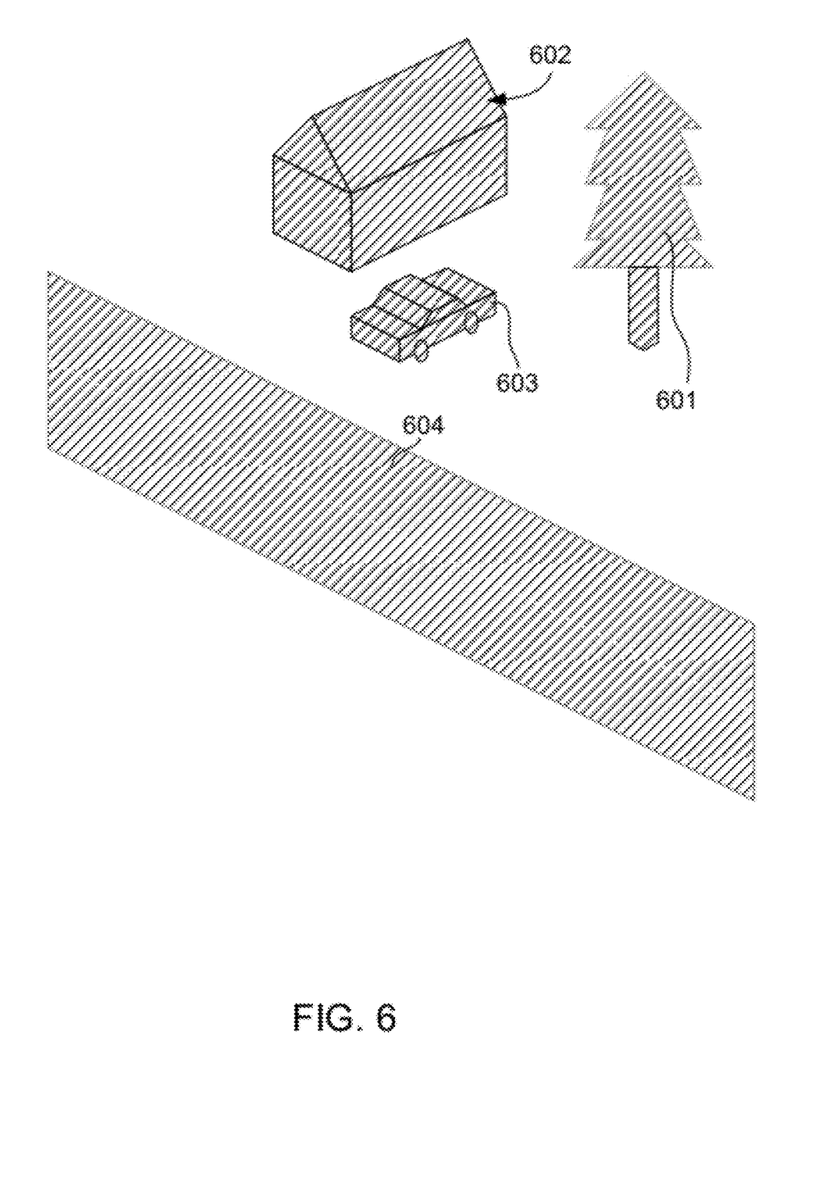
FIG. 6 illustrates polygon based models representing subject matter.

Referring now to FIG. 6, point cloud arrays can be converted to three-dimensional polygon based models of artifacts present in the image data sets. The three-dimensional polygon based models are based upon physical attributes determined by processing the two-dimensional image data. For examples a polygon model of a tree 601 will be based upon point clouds derived from two or more two-dimensional data sets. Similarly, a structure 602, a motor vehicle 603 and a roadway may also be represented as three-dimensional polygon based models.

According to the present invention, image data derived from image data sets corresponding to the three-dimensional models can be sprayed over the three-dimensional polygon models. In addition, positional data can be related to each polygon model and used to position the polygon model relative to other image data and polygon models. In some embodiments, polygon models are arranged in a continuum of image data according to the positional data.

Figure 7:
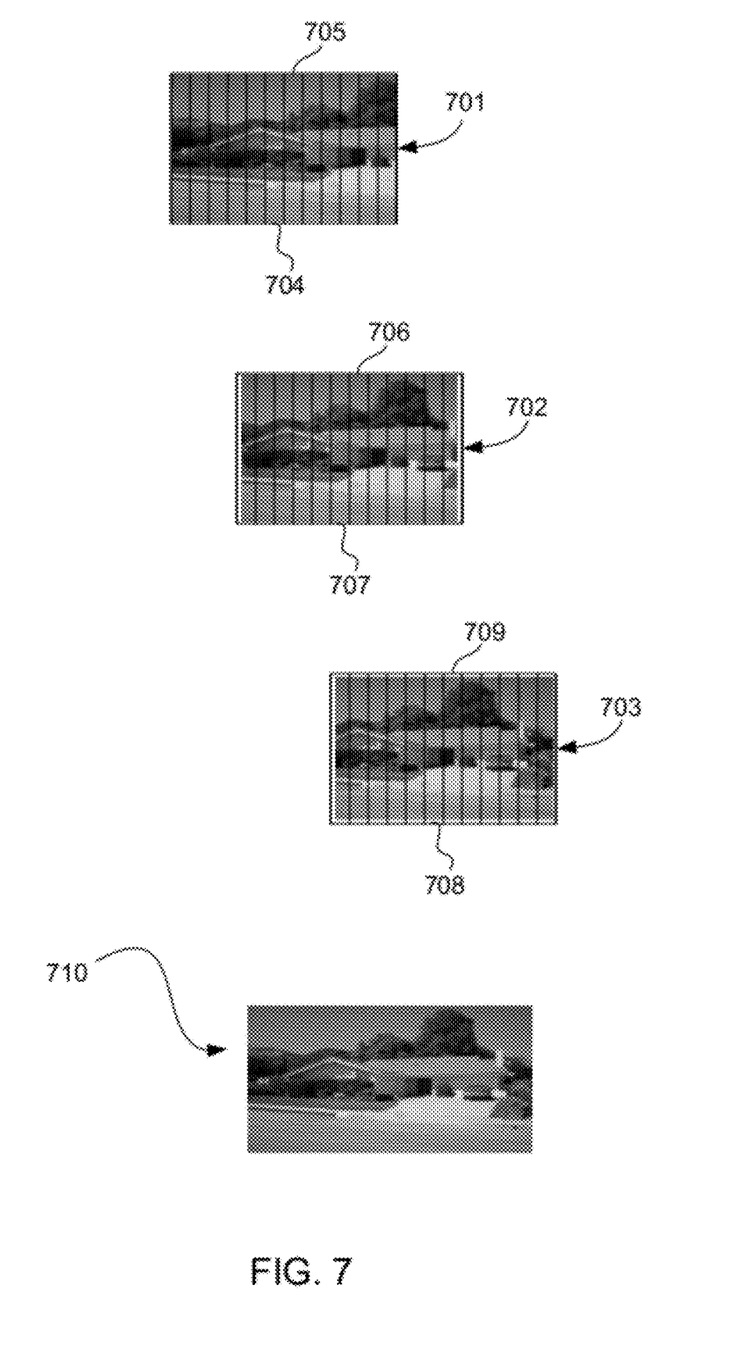
FIG. 7 illustrates exemplary data sets.

Referring now to FIG. 7, in some preferred embodiments, image data sprayed over the three-dimensional polygon formats includes a composite image is formed by aligning two or more of the image data sets. Unlike stitching processes previously known, the present invention creates a composite through alignment of portions of data from more than one data set. Alignment can be accomplished in image data processing. Using image data processing, the images 701-703 are aligned to form a composite image 700. The composite image 700 is essentially two dimensional image data arranged as a second continuum, or ribbon. The second continuum includes ongoing image data 701-703 captured from the points defining the first continuum.

In some particular embodiments, the series of points of image capture in the first continuum includes positions of a vehicle carrying an image capture device, such as a camera, as the vehicle traverses a path proximate to a geographic area. The camera is positioned to capture image data of the geographic area. Image data 701-703 is periodically captured as the vehicle traverses the path. The motion of the vehicle, combined with the periodic capture of image data 701-703, thereby results in image data 701-703 being captured from disparate points along the first continuum.

A preferred embodiment includes capture of image data with a motion vector of the camera in space maintained generally orthogonal to a subject for which image data will be captured. Orthogonal capture of the image data can facilitate consistency for subsequent composite of portions of the image data captured. Therefore, data captured at an angle of between about 75° and 105° can provide data most easily assembled into a continuum of data. However, other angles may be used to create different effects. In addition, in some embodiments physical limitation may dictate the use of other angles. In such instances, post processing can be utilized to compensate for the angle of image data capture.

During image data processing, some or all of the images are aligned to form a composite image in the form of a continuous pictorial representation of the geographic area. One commercial embodiment of a continuous pictorial representation includes RibbonView™ by Real Data Systems. RibbonView™ correlates a ribbon of geographic image data with geospatial designations to facilitate identification of a particular geographic area, as discussed more fully below. In various embodiments, image capture processing can be accomplished in real time or via post image capture processing.

In some embodiments, select portions 704-707 of two or more sets of captured image data are aligned to generate the composite image 708. As illustrated, some preferred embodiments include vertical slices of data 704-707 aligned in a horizontal plane to form the composite image 708. Unlike a traditional photograph taken with a macro lens, according to the present invention, the length of a horizontal plane defining a composite image 708 is only limited by the length of a continuum along which points are defined and from which image data 704-707 is captured.

The use of only slices of data 704-707 from any particular captured image provides for a higher quality image 708. The quality is increased, for example, when a temporary obstruction, such as a passing car, person or animal, captured in one image data set, is only represented in a thin slice of a continuous ribbon 704-707 data. In addition, alignment of multiple thin slices of image data 704-707 is facilitated from the perspective of which aberrations typical human sensory is capable of distinguishing. Numerous thin slices 704-707 are perceived as a smoother transition across the horizontal plane defining the composite image 708 removing a choppiness that may be experienced with the use of larger data images.

The present invention can include a uniform width of each slice of data 704-707 or a variable width. The width of a particular slice may vary, for example, upon one or more of the velocity of a vehicle from which image data sets are captured, the sample rate of a camera used to capture an image data set 701-703, the resolution of a picture comprising an image data set 701-703 and the path of a camera. A high resolution image generated by a 2.1 mega pixel camera may have a 1600 by 1200 resolution and allow for a thinner slice 704-707 that includes a width of between about 5 to 700 pixels of an image data set. Embodiments with very high quality can include a slice 704-707 of between 1 to 2 pixels.

From a different perspective, some embodiments can include a slice 704-707 of an image data set 701-703 that includes a percentage of the image data set 701-703. Accordingly, some preferred embodiments can include a slice 704-707 of between about 5% to about 12% of an image data set. Other preferred embodiments can include up to about 50% of an image data set. However, it should be understood that some embodiments include a slice 704-707 that constitutes any fraction of the complete image data set.

Referring now to FIG. 7, three sets of image data 701-703 are illustrated, wherein each set of image data 701-703 represents data captured from a disparate point on a continuum proximate to the landscape captured. A direction of travel along the continuum 700 is also illustrated. Each data set 701-703 is divided into multiple slices of image data 704-709. A composite image 270 is generated from the multiple slices 704-709, and in the exemplary case at hand, additional slices from additional image data sets.

It should be noted that although preferred embodiments may utilize vertical rectangular slices 704-709, the scope of the present invention is not limited by which portion of an image data set 701-703 is utilized to generate a composite image 270. Therefore, it is within the scope of the invention to use any portion of any image data set 701-703 to generate a composite image. Accordingly, slices of an image 701-703 other than vertical slices 704-709 may be apportioned and combined into a composite image 720. Slices may therefore include a slice angled at 60° or 75°, or other angle conducive to a particular application. In addition, it is also within the scope of the present invention to utilize irregular shaped portions of two or more image data sets 701-703 to generate a composite image 720.

In some embodiments, a database or other data processing mechanism, can track each portion or slice 704-708 utilized to construct a continuum and associate the slice 704-708 with an original image 701-703 from which the slice 704-708 is derived. User interactive devices can execute the retrieval of an entire original image 701-703 or a series of original images 701-703 upon request. In some instances, one or more original images 701-703 may provide detail not included in the composite image 708.

In some embodiments, a selected portion of an image data set may be determined by the physical attributes of the equipment used to capture an image data set. For example, a typical camera lens can impart some distortion to an image data set, as represented in the illustration by an elongated portion and a compressed portion. Utilizing only a portion of an image data set, such as, for example, a center portion vertical slice, can minimize the effect of distortion introduced by a lens, or other source, to a composite image. Distortion is minimized when the composite image is made to include those portions of the image data set corresponding with the center of the lens. Specific embodiments may likewise account for other aberrations that may be present in a set of image data.

It will be apparent to those schooled in the art that the length of a composite image generated according to the present invention is limited only by the ability to capture image data from additional points on a continuum and store the captured image data for post processing. Image data processing allows for the alignment of portions of the image data compiled into a composite two-dimensional view that can continue so long as additional image data is made available to be added to it.

In another aspect of the present invention, in addition to image data sets captured from disparate points along the continuum, additional data may also be captured from various disparate points along the continuum and correlated with the image data. For example, in some embodiments, the strength of communications signals can be captured at some or all of the disparate points and recorded in relation to the geographic location at which they were recorded. Communications signals can include, for example, cellular phone signals available at a given point. Geospatial data can be recorded which correlates with the cellular phone signal strength and the image data set. Other measurements may include, for example: wireless network data, including network name, location and signal strength; global position system satellite data and signal strength; radio signal strength; and almost any other measurable quantity. Datum can all be correlated according to a geographic location and presented in various combinations or upon demand. In addition, the data can be presented in conjunction with or independent of, an image data continuum or image data set.

Apparatus

Figure 8:
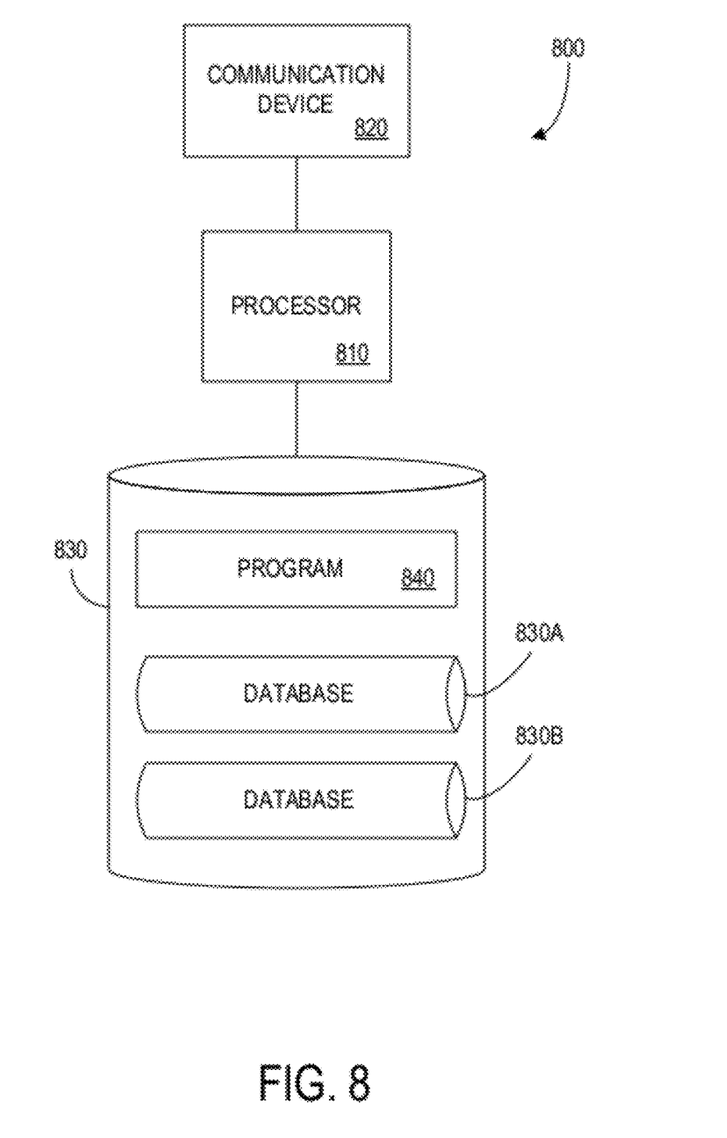
FIG. 8 illustrates a block diagram of exemplary apparatus that may be used to implement some embodiments of the present invention.

The teachings of the present invention may be implemented with any apparatus capable of embodying the innovative concepts described herein. Image capture can be accomplished, for example, via a digital camera capable of capturing 12 or more images per second. In addition, FIG. 8 illustrates a controller 800 that may be utilized to implement some embodiments of the present invention. The controller 800 comprises a processor unit 810, such as one or more processors, coupled to a communication device 820 configured to communicate via a communication network (not shown in FIG. 8). The communication device 820 may be used to communicate, for example, with one or more online devices, such as a personal computer, laptop or a handheld device.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with the present invention. The processor 810 may also cause the communication device 820 to transmit information, including, in some instances, control commands to operate apparatus to implement the processes described above. The storage device 830 can additionally store related data in a database 830A and database 830B, as needed.

In some preferred embodiments, apparatus includes a video and data server farm. The video and data server farm includes at least one video storage server that stores video image files containing video drive-by data that corresponds to a geographic location, a database server that processes a data query received from a user over the Internet that corresponds to a geographic location of interest, and an image server. In operation, the database server identifies video image files stored in the video storage server that correspond to the geographic location of interest contained in the data query, and transfers the video image files over a pre-processing network to the image processing server. The image processing server converts the video drive-by data to post processed video data corresponding to a desired image format, and transfers the post processed video data via post-processing network to the Internet response to the query.

A landing zone server can also be included which receives the video drive-by data from a portable memory device and permits the viewing and analysis of the video drive-by data prior to storage in the video storage server. Still further, a map server is preferably provided to present a static image an overhead view of the geographic location of interest.

Embodiments can also include one or more servers described above included in one or more physical units. Each server does not need to be a disparate apparatus. Still other embodiments can include one or more or the servers described above included in multiple physical units. Some embodiments can even include a single server, as described which includes multiple physical apparatus units at disparate locations.

CONCLUSION

A number of embodiments of the present invention have been described. Nevertheless, it will be understood that various modifications may be made without departing from the spirit and scope of the invention. For example, various methods or equipment may be used to implement the process steps described herein or to create a device according to the inventive concepts provided above and further described in the claims. In addition, various integration of components, as well as software and firmware can be implemented. Accordingly, other embodiments are within the scope of the following claims.

What is claimed is:

1. Apparatus for creating a continuum of image data, the apparatus comprising:
   a processor operatively attached to a data storage device and executable computer code stored upon the data storage device and executable upon demand to cause the processor to:
   a) receive multiple two-dimensional image data sets of a subject, wherein each image data set is captured from a disparate point on a continuum and each image data set comprises a plurality of features;
   b) generate a composite image of the subject from portions of two or more of the multiple two-dimensional image data sets, wherein the portions are aligned in a dimension consistent with the continuum;
   c) receive data descriptive of a location of the plurality of features;
   d) track the position of at least one of the plurality of features in two or more of the two-dimensional images;
   e) generate a point cloud array for the at least one of the plurality of features;
   f) convert the point cloud array to a polygon based model; and
   g) associate a location for the polygon based model relative to the portions of the image data sets and based upon the location of the plurality of features.

2. The apparatus of claim 1 wherein the software is additionally operative to virtually spray image data onto the polygon based model, wherein the polygon based model comprises at least one three dimensional polygon based model and wherein the image data sprayed onto the polygon based model is based upon two-dimensional image data sets and the location of the polygon based model.

3. The apparatus of claim 1 wherein the software is additionally operative to associate the polygon based model with an icon.

4. The apparatus of claim 3 wherein the icon is symbolic of at least one of: a fire hydrant; a utility location; and traffic signal device.

5. The apparatus of claim 1 wherein the software is additionally operative to:
repeat steps a) through f) multiple times each from disparate points along the continuum; and
spray image data onto one or more polygon based models, wherein the image data sprayed onto the one or more polygon based models is based upon two-dimensional image data sets and the location of each respective polygon based model.

6. The apparatus of claim 1 wherein the point cloud array in a polygon format is generated by the software being additionally operative to execute to:
cast a ray through each pixel comprising a feature comprising the multiple two-dimensional image data sets, wherein the ray originates in a position based upon the disparate point on a continuum;
determine an intersection of each ray associated with the first two-dimensional image data set and each ray associated with the second two-dimensional image data set; and
create a voxel for a three-dimensional point cloud array at each intersection.

7. The apparatus of claim 2 wherein the image data sprayed onto the polygon based model comprises:
a composite image of the subject generated from aligned portions of two or more two-dimensional image data sets captured from the disparate points along the continuum and aligned in a dimension consistent with the continuum.

8. The apparatus of claim 1 wherein the data descriptive of a location comprises a Cartesian coordinate.

9. The apparatus of claim 8 wherein the data descriptive of a location of the plurality of features comprises a latitude and longitude coordinate.

10. The apparatus of claim 1 wherein the software is additionally operative to associate metadata with a polygon based model.

11. The apparatus of claim 1, wherein the composite image comprises a single vertical slice of each of the two or more images.

12. The apparatus of claim 11, wherein the software is additionally operative to:
record positional data descriptive of a respective location of each of the multiple two-dimensional image data sets of a subject: and
associate the composite image with a particular portion of the subject based upon the positional data.

13. The apparatus of claim 12 wherein the subject comprises a geographic area and the positional data comprises a geospatial designation.

14. The apparatus of claim 13 wherein the software is additionally operative to generate the positional data based upon latitude and longitude coordinates of a camera capturing the two or more images and data descriptive of the camera orientation while the camera captured the two or more images.

15. The apparatus of claim 13 wherein the different points in a continuum comprise positions of a vehicle traveling on a roadway.

16. The apparatus of claim 12 wherein the software is additionally operative to overlay metadata on the composite image, wherein the metadata is descriptive of the composite image.

17. The apparatus of claim 12 wherein the method additionally comprises the steps of overlaying links to additional data related to the composite image.

18. The apparatus of claim 17 wherein the additional data is related to the composite image based upon the positional data.

19. The apparatus of claim 13 wherein each of the two or more images are captured with a camera at a position about orthogonal to the subject matter.

20. The apparatus of claim 19 additionally comprising an altimeter and wherein the software is additionally operative to receive data indicative of an altitude of the camera at the instance of image capture.

* * * * *